(12) United States Patent
Kreis et al.

(10) Patent No.: US 10,807,459 B2
(45) Date of Patent: Oct. 20, 2020

(54) ENGINE POWER DELIVERY SYSTEM WITH TRANSMISSION GEARING BYPASS

(71) Applicant: Deere & Company, Moline, IL (US)

(72) Inventors: Edwin R. Kreis, Waterloo, IA (US); Mahendra Patil, Raver (IN); Jeffrey Lubben, Hudson, IA (US)

(73) Assignee: DEERE & COMPANY, Moline, IL (US)

(*) Notice: Subject to any disclaimer, the term of this patent is extended or adjusted under 35 U.S.C. 154(b) by 119 days.

(21) Appl. No.: 16/160,265

(22) Filed: Oct. 15, 2018

(65) Prior Publication Data

US 2020/0114749 A1    Apr. 16, 2020

(51) Int. Cl.
| | |
|---|---|
| *B60K 6/547* | (2007.10) |
| *B60K 6/445* | (2007.10) |
| *B60K 6/26* | (2007.10) |
| *B60W 20/40* | (2016.01) |
| *B60W 20/10* | (2016.01) |

(52) U.S. Cl.
CPC ............ *B60K 6/445* (2013.01); *B60K 6/26* (2013.01); *B60K 6/547* (2013.01); *B60W 20/10* (2013.01); *B60W 20/40* (2013.01); *B60W 2710/083* (2013.01); *B60Y 2200/22* (2013.01); *B60Y 2200/41* (2013.01); *B60Y 2300/78* (2013.01)

(58) Field of Classification Search
CPC .. B60K 2006/4808; B60K 6/48; B60K 6/485; B60K 6/52; B60K 6/54; B60K 6/547; B60K 6/44
See application file for complete search history.

(56) References Cited

U.S. PATENT DOCUMENTS 7,128,677 B2 * 10/2006 Supina ................. B60W 20/40
475/5
8,323,144 B1    12/2012 Bin et al.
(Continued)

FOREIGN PATENT DOCUMENTS

| DE | 102009050957 A1 | 5/2011 |
| DE | 102011111751 A1 | 2/2013 |
| DE | 102018209939 A1 | 12/2018 |

OTHER PUBLICATIONS

John Deere, 9620RX, Copyright 2017 Deere & Company, 2 pages.
German Search Report issued in counterpart application No. 102019215806.4 dated Aug. 10, 2020 (14 pages).

*Primary Examiner* — Sherry L Estremsky
(74) *Attorney, Agent, or Firm* — Klintworth & Rozenblat IP LLP (57) ABSTRACT

An engine power delivery system provides bifurcated power-flow with transmission bypass. An engine power delivery system includes an engine that has an output element. A transmission has an input shaft coupled with the engine output element, wherein the engine is configured to generate more power than the transmission is capable of handling. A multi-speed gearing arrangement is included in the transmission and is coupled to the input shaft. An output shaft is coupled with the gearing arrangement and a vehicle axle is coupled with the output shaft to be driven thereby. A generator is configured to be intermittently driven by the engine. A motor is configured to receive electric power from the generator and to drive the vehicle axle without the transmission exceeding the maximum power rating.

19 Claims, 7 Drawing Sheets

(56) References Cited

U.S. PATENT DOCUMENTS

| | | | | |
|---|---|---|---|---|
| 8,425,377 | B2* | 4/2013 | Liang | B60K 6/44 |
| | | | | 477/5 |
| 9,428,049 | B2* | 8/2016 | Janasek | B60K 6/12 |
| 10,040,442 | B2* | 8/2018 | Kato | B60K 6/445 |
| 10,204,729 | B2* | 2/2019 | Yonak | B60K 6/445 |
| 2007/0225099 | A1* | 9/2007 | Cho | B60K 6/365 |
| | | | | 475/5 |
| 2011/0300983 | A1* | 12/2011 | Kurokawa | B60K 6/365 |
| | | | | 475/5 |
| 2019/0346036 | A1* | 11/2019 | Ore | B60K 6/08 |

\* cited by examiner

ENGINE POWER DELIVERY SYSTEM WITH TRANSMISSION GEARING BYPASS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to engine power delivery systems, and to vehicle drive arrangements for engine power delivery with a bypass of the transmission multi-speed gearing.

BACKGROUND OF THE DISCLOSURE

Work vehicles, such as those used in the agriculture, construction and forestry industries, and other vehicles, equipment and machinery, may be driven by a power plant which often includes an internal combustion engine or an alternative power source. Power is transferred to the drive wheels through a drivetrain that typically includes a drive shaft, a transmission to provide multiple speeds through various gear ratios, and may include one or more differentials to split power between the two sides of the vehicle. Power may be delivered to one or more axles. The power source, the transmission and the differential are typically packaged in series, with power developed by the engine and/or alternative power sources being delivered through the transmission multi-speed gearing. The typical configuration requires a transmission sized to handle the entire power and torque delivered to the drive wheels, particularly that developed by an internal combustion engine. Accordingly, other options enabling the use of a lighter duty transmission would be more cost and timing effective from development and manufacture perspectives.

SUMMARY OF THE DISCLOSURE

The disclosure provides an engine power delivery system with bypass of a transmission's multi-speed gearing in delivering maximum power from the engine to the drive axles. In one aspect, an engine power delivery system includes an engine with an output element. A transmission has a maximum power rating and a shaft coupled with the engine output element. The engine generates a maximum power level that is greater than the maximum power rating of the transmission. A gearing arrangement in the transmission is coupled with the shaft and produces multiple speed ratios. An additional shaft is coupled with the gearing arrangement. A vehicle axle is coupled with the additional shaft and is configured to be driven thereby. A generator is configured to be intermittently driven by the engine to generate electric power. A motor is configured to receive the electric power from the generator and to drive the vehicle axle. The transmission and the motor are configured to combine to drive the vehicle axle up to the maximum power level without the transmission exceeding the maximum power rating.

In another aspect, an engine power delivery system includes an engine driving a shaft. A transmission is coupled with the shaft. A gearing arrangement in the transmission is driven by the shaft, and produces multiple speed ratios. An additional shaft is coupled with the gearing arrangement and is driven at a variety of output ratios relative to the first shaft. A vehicle axle is coupled with the second shaft and is driven thereby. Another shaft is driven by the first shaft at a single output ratio. A generator is intermittently driven to generate electric power, and a motor is electrically coupled with the generator and drives the vehicle axle.

In an additional aspect, a power delivery system for a work vehicle includes an internal combustion engine driving a first propulsion shaft. A transmission unit has a transmission housing and has an input shaft that is coupled with the first propulsion shaft and extends into the housing. A gearing arrangement is configured to deliver multiple speed ratios and is disposed in the transmission housing. The gearing arrangement is coupled with the input shaft within the transmission housing. A front axle is driven by the engine through the transmission. A second propulsion shaft couples the front axle with the transmission. A rear axle is also driven by the engine through the transmission. A third propulsion shaft couples the rear axle with the transmission. A fourth propulsion shaft couples a gearset with the transmission. A generator is coupled with the gearset and is intermittently driven to produce electric power. A motor is electrically coupled with the generator. The motor drives the front and rear axles through a gearbox. The second propulsion shaft extends through the gearbox.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of a disclosed engine power delivery system, as shown in the accompanying figures of the drawings described briefly above. Various modifications to the example embodiments may be contemplated by one of skill in the art.

In one or more example implementations of the disclosed engine power delivery system, the system provides available bifurcated power-flow with transmission bypass for maximum power delivery from the engine. The engine power delivery system includes the engine and the transmission which is coupled with the engine to receive power therefrom. The engine may be configured to generate more power than the transmission is capable of handling. A multi-speed gearing arrangement is included in the transmission, through which power from the engine is delivered to the vehicle axles. The engine power delivery system also includes a generator that is configured to be intermittently driven by the engine, and a motor that is electrically coupled with the generator and that contributes to driving the vehicle axle under electric power derived from the engine, without going through the multi-speed gearing arrangement. The engine power delivery system also includes various shafts, torque transfer elements, and other elements and units as described below.

The following description relates to engine power delivery systems in the context of certain work vehicle related applications for purposes of demonstrating examples. With an internal combustion engine driven vehicle, the conversion of thermal energy into mechanical drive is used for vehicle motion. With regard to the example work vehicle, this entails using the internal combustion engine to rotate tracks that contact the ground to propel the vehicle. Propulsion of such a vehicle is accomplished over a wide range of operating conditions and involves the use of a transmission that provides a selection of multiple gears. In addition, the engine may be capable of a very high level of power output. Providing a transmission for such applications requires substantial development time and cost, and requires a transmission that is capable of carrying the power and torque loads in all encountered conditions. In an example of the present disclosure as further described below, a bifurcated power delivery system is used to deliver excess power from the engine, without requiring a transmission of a capacity that is sized to handle the full power output of the engine. Providing a transmission with lower power and torque ratings than the engine is capable of delivering, saves in development time and cost for the transmission.

Figure 1:
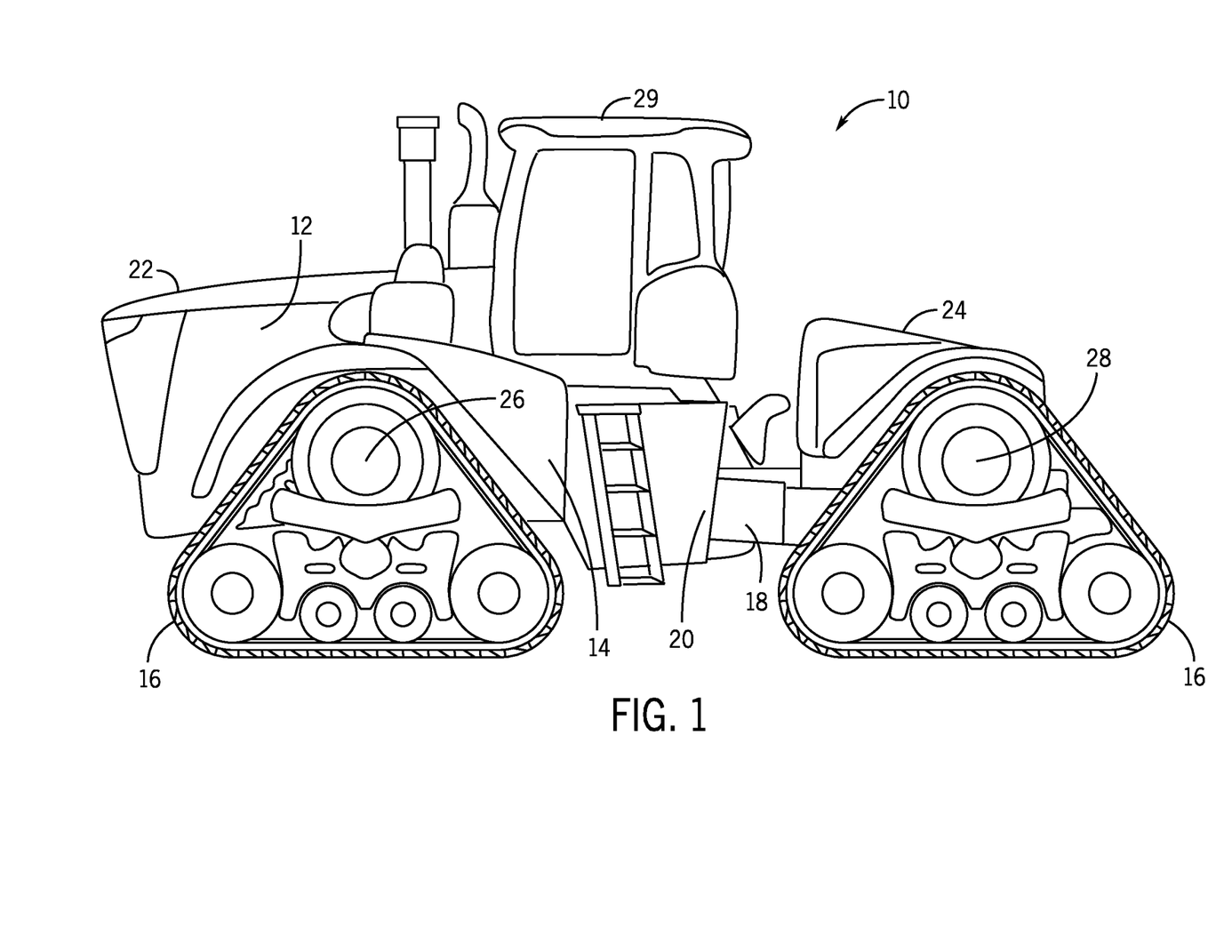
FIG. 1 is a side view of an example work vehicle in the form of an articulated agricultural tractor in which the disclosed engine power delivery system may be used.

As noted above, the engine power delivery system as described herein may be employed in a variety of applications, including non-vehicle applications. Referring to FIG. 1, one example application involves an engine power delivery system that may be included in a work vehicle 10, which in this example is depicted as a tracked, articulated agricultural tractor. It will be understood however, that other configurations are contemplated, such as configurations with the work vehicle 10 as a different kind of tractor, or as a work vehicle used for other aspects of the agriculture industry, or for the construction or forestry industries (e.g., a harvester, a log skidder, motor grader, and so on), including those with wheels instead of tracks. It will further be understood that the disclosed engine power delivery system may also be used in non-work vehicles where engine power outputs exceed transmission capacity, or exceed the desire to route power through the transmission.

In the current example, the work vehicle 10 is designed as a high capacity pulling machine that efficiently delivers a very high level of power to the ground and is built for pulling power. In general, the work vehicle 10 includes an engine 12 that delivers high horsepower, and includes a multi-speed (e.g. 18 forward gears) electronically controlled transmission 14 configured in a known manner. The available power from the engine 12 may be higher than the power rating of the transmission 14. The work vehicle 10 includes a drive system with four track sets 16, providing a high level of traction to transfer maximum power to the ground and for pulling the heaviest loads and for making easy work of applications like cultivating, ploughing, ripping and planting. In other examples, the track sets 16 may be replaced by wheels. Delivering such a high level of horsepower requires driveline components capable of handling the load. To avoid the need to redesign all driveline components, in particular the long lead time and costly transmission 14, or for other reasons to bypass the transmission 14, the current disclosure delivers the engine power through a bifurcated delivery system.

The work vehicle 10 has a main chassis 18 that in this example is articulated at a joint 20 to assist with maneuverability. The joint 20 connects a front unit 22 with a rear unit 24. The chassis 18 is supported by the track sets 16, which engage the ground. The track sets 16 support the chassis 18 through axle assemblies 26, 28. Two or more of the track sets 16 may be powered for propelling the work vehicle 10, and in this example all four track sets 16 are powered. The chassis 18 supports the engine 12, which serves as a power plant for generating power, and which in this example is in the form of an internal combustion engine. An operator cabin 29 is provided in which operator interface and control means (e.g., various controls wheels, levers, switches, buttons, screens, keyboards, etc.) are stationed. The work vehicle 10 may be configured to use and/or to provide to other connected equipment, power from the engine 12 to generate electric power and/or to drive mechanical, fluid powered, and/or other functions. In the current example, the axle assemblies 26, 28 are provided with supplemental power from the engine 12 in the form of electric power and the vehicle 10 includes supporting systems and equipment for delivering the electric power as further described below.

Figure 2:
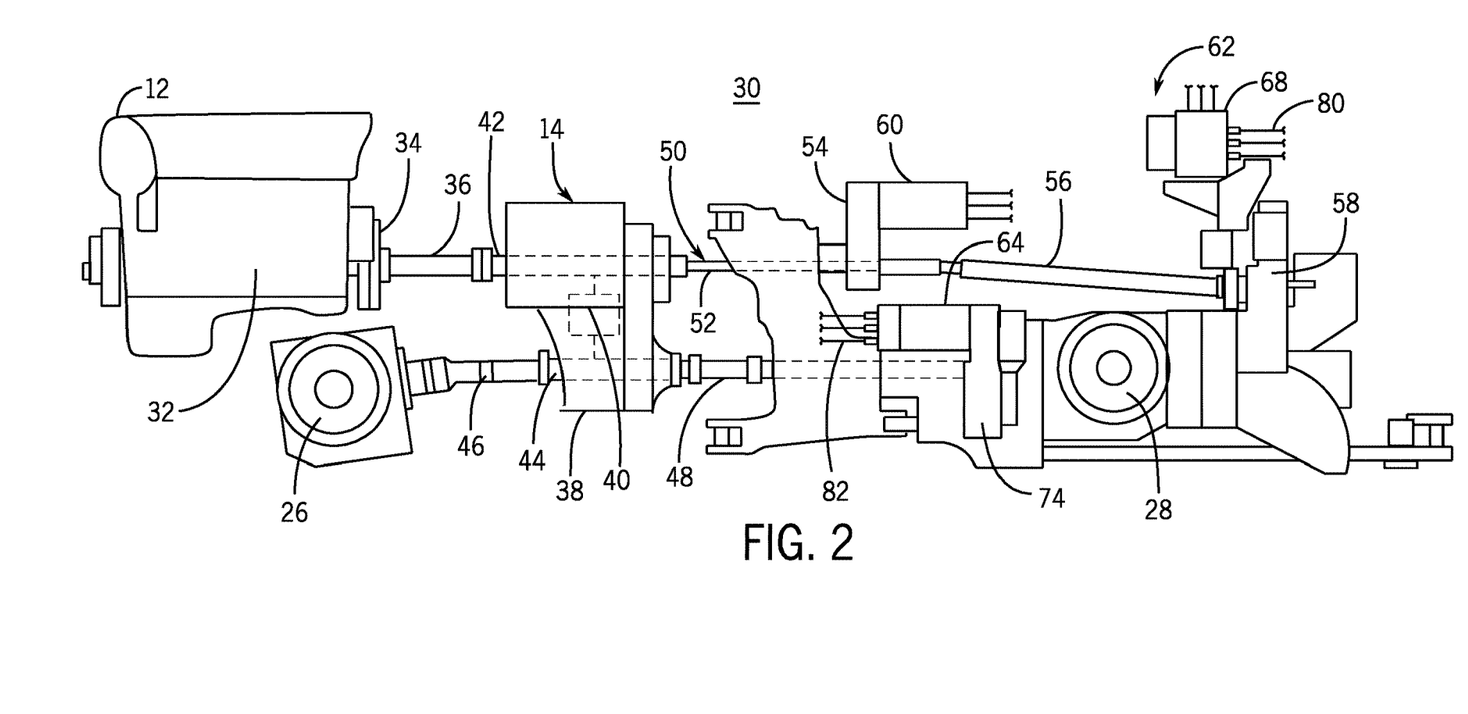
FIG. 2 is a simplified illustration of the engine power delivery system of the work vehicle of FIG. 1.
Figure 3A:
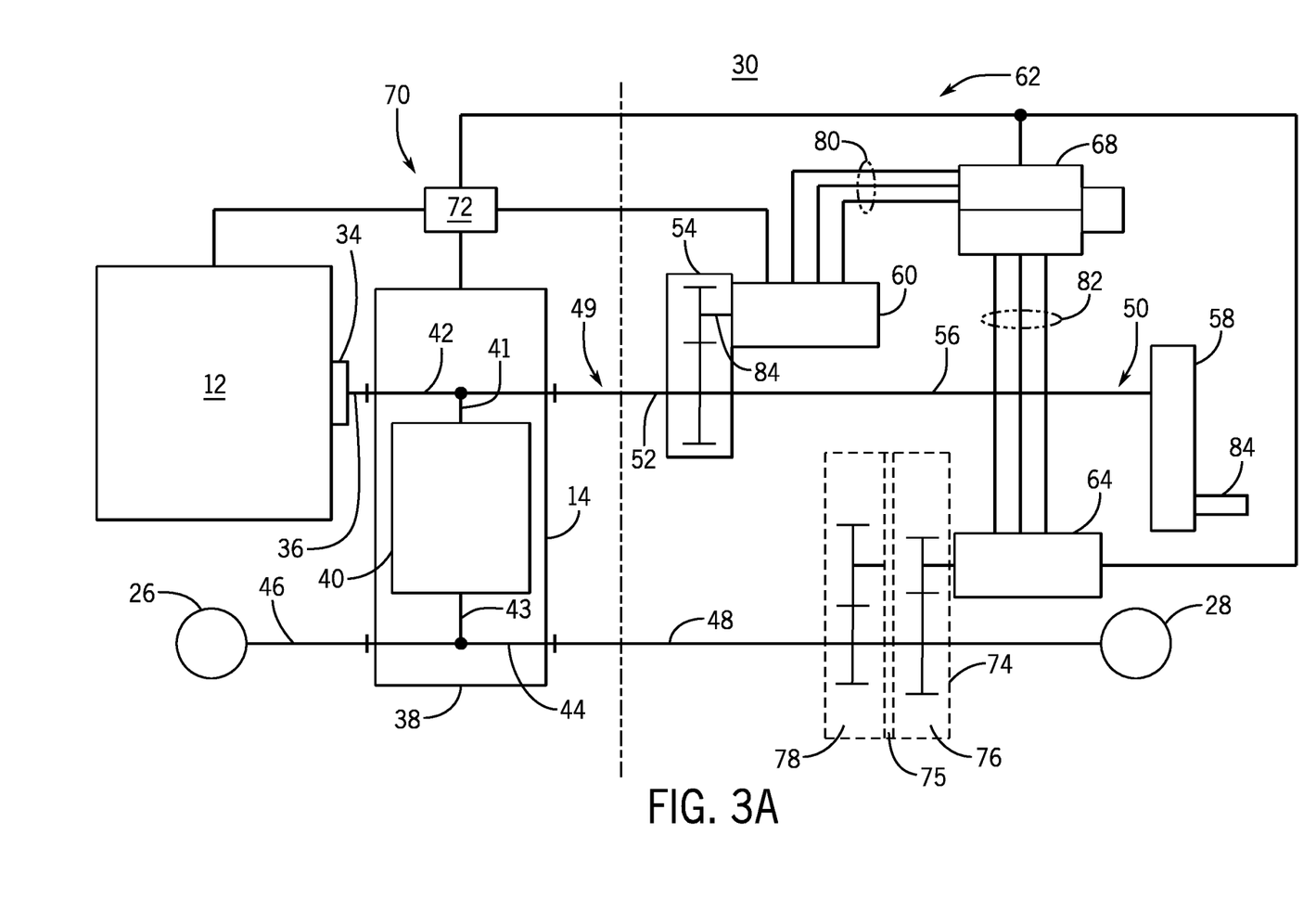
FIG. 3A is a schematic illustration of the engine power delivery system of FIG. 2, according to this disclosure.

Referring to FIGS. 2 and 3A, the power delivery system 30 is shown isolated from other components of the work vehicle 10 for visibility in FIG. 2 and in schematic form in FIG. 3A. The engine 12 includes a number of cylinders that reciprocate in an engine block 32 to generate rotary power delivered through an output element 34, such as one or more of a shaft (crankshaft), flywheel, clutch, other torque transfer elements, etc. Through the output element 34 and a propulsion shaft 36, the engine 12 is mechanically coupled with the transmission 14 to supply power thereto in the form of rotary motion. The propulsion shaft 36 allows the transmission 14 to be positioned physically separated from the engine 12, and in other examples, may be omitted where separation isn't desired. The transmission 14 includes a transmission housing 38 that houses the internal elements, which include typical elements such as gears, bearings, shift mechanisms, and various torque transfer elements to achieve a desired number of forward and reverse gears in a multi-speed gearing arrangement 40 in a known manner.

Power from the engine 12 passes into the transmission 14 as input through a top shaft 42 and then through a torque transfer element 41 into the multi-speed gearing arrangement 40. From the multi-speed gearing arrangement 40 power flows through another torque transfer element 43 and as output into a bottom shaft 44 that extends through the transmission housing 38 and is coupled with a front propulsion shaft 46 and with a rear propulsion shaft 48. The front propulsion shaft 46 is coupled with the front axle assembly 26, and the rear propulsion shaft 48 is coupled with the rear axle assembly 28. The front and rear propulsion shafts 46, 48 are coupled with each other through the bottom shaft 44. Both axle assemblies 26, 28 are coupled with the engine 12 through the output element 34, the propulsion shafts 36, 46, 48 and the transmission 14, including through the top shaft 42, the multi-speed gearing arrangement 40, and the bottom shaft 44. Accordingly, the engine 12 is mechanically connected with the axle assemblies 26, 28 to deliver power thereto. As further described below, the engine 12 and the transmission 14 are controlled to limit the power that can be delivered mechanically to the axles assemblies 26, 28 and as a result, the maximum power and torque output of the engine 12 is not delivered solely mechanically.

The power delivery system 30 also includes a bypass 49 of the multi-speed gearing arrangement 40 of the transmission 14 to deliver power from the engine 12 to the axle assemblies 26, 28 without routing through the multi-speed gearing arrangement 40. The bypass 49 is associated with a power take-off (PTO) driveline 50, that is used to drive a PTO unit 58. The bypass 49 includes the top shaft 42 of the transmission 14, which extends through the transmission housing 38 and is coupled at one end to the propulsion shaft 36, and at an opposite end is coupled with the PTO driveline 50 at a propulsion shaft 52. The propulsion shaft 52 is coupled to a gearset unit 54. The gearset unit 54 is coupled with a PTO shaft 56 that extends to the PTO unit 58, which is configured to couple with implements and accessories that have features powered by the work vehicle 10. The gearset unit 54 is also coupled with a generator 60 that is a component of an electric drive system 62. In various implementations, the gearset unit 54 and the generator may be mounted and driven differently than in the example implementations described herein. For example, the gearset 54 and generator 60 may be mounted directly or in close proximity to the engine 12 or the transmission 14 for power transmission without passing first through the PTO driveline or bypass.

The electric drive system 62 includes the generator 60, a motor 64, power electronics 68, a control system 70, and various electric cables or connections. In addition, various sensors, actuators and other typical electrical devices may be included but are not shown. The components of the electric drive system 62 convert, condition, communicate and control power delivered from the mechanical motion of the engine 12 to suitable electric power from the generator 60 for delivery to and use by the motor 64. In other examples, the power electronics 68 may also operate to convert energy generated by the generator 60 for storage in a battery system (not shown). The power electronics 68 may include rectifiers, inverters, converters, controls and other typical devices to provide the required conversion and control of electric power to support operation of the generator 60, the motor 64 and other associated electrical components of the nature and at the voltage level to which the electric drive system 62 is designed.

As shown in FIG. 3A, the control system 70 includes at least one controller 72 that is electrically coupled with the engine 12, the transmission 14, the generator 60, the motor 64 and the power electronics 68 to provide control functions. The controller(s) 72 may also be coupled with other devices necessary to provide the desired system control functions including various actuators and sensors such as speed sensors (not shown). The controller(s) 72 may include one or more computing devices such as various processor devices and various associated memory architectures. In certain embodiments, the controller(s) 72 may additionally (or alternatively) include various other electronic control circuits and devices (e.g., various electronics devices or programmable circuits). The controller(s) 72 may be disposed separately from other components (e.g., as shown in FIG. 3A) or can be integrated into various components, such as the engine 12 and the transmission 14. In some embodiments, the controller(s) 72 may be dedicated to the functionality disclosed herein. In some embodiments, the controller(s) 72 may be configured to provide other functionality of the work vehicle 10, and/or of connected implements, in addition to the control functions disclosed herein.

The electric power delivered from the generator 60, through the power electronics 68, is converted back to mechanical power at the motor 64. The motor 64 is coupled with the axle assemblies 26, 28 through a gearbox 74. In this example, the gearbox 74 is a two-speed gearbox in which input from the motor 64 is delivered to the propulsion shaft 48 through two alternate gear paths 76, 78, which provide two different speed ratios. In addition, the gearbox 74 may have a neutral position 75 to decouple the motor from the propulsion shaft 48. Through the gearbox 74 and the propulsion shaft 48, the motor 64 is coupled to deliver power to both axle assemblies 26, 28. In the case of the front axle assembly 26, power from the motor 64 is conveyed through the gearbox 74, the propulsion shaft 48, the bottom shaft 44, and the propulsion shaft 46, to the axle assembly 26. In the case of the rear axle assembly 28, power from the motor 64 is conveyed through the gearbox 74 and the propulsion shaft 48 to the axle assembly 28. Although the power to the front axle assembly 26 again passes through the transmission housing 38 via the bottom shaft 44, it does so without passing through the multi-speed gearing arrangement 40. In total, power of the bypass 49 passes through the transmission housing 38 twice without passing through the multi-speed gearing arrangement 40, once through the top shaft 42 on route to the generator 60, and a second time through the bottom shaft 44 on route to the front axle assembly 26.

The electric drive system 62 includes conductors 80 coupled between the generator 60 and the power electronics 68 and conductors 82 coupled between the power electronics 68 and the motor 64. In addition, electrical communication is established between the controller(s) 72 and the engine 12, the transmission 14, the generator 60, the motor 64, the power electronics 68 and the gearbox 74. Under normal power requirements of the work vehicle 10 up to the maximum power rating of the transmission 14, the controller(s) 72 control the power delivery system 30 to supply power to the axle assemblies 26, 28 from the engine 12 through the transmission 14, including the multi-speed gearing arrangement 40, and the propulsion shafts 46, 48. Power from the engine 12 is also available at a PTO shaft 84 for use by implements and accessories. Power to the PTO shaft 84 is conveyed from the engine 12, through the output element 34, the propulsion shaft 36, the top shaft 42 of the transmission 14, and the PTO driveline 50 including the propulsion shaft 52, the gearset unit 54, the PTO shaft 56, and the PTO unit 58. The controller(s) 72 is/are programmed to limit power output of the engine 12 to the maximum power rating of the transmission 14, when operating in a pure mechanical mode through the multi-speed gearing arrangement 40. The generator 60 is deactivated during pure mechanical operation and the electric drive system 62 is in standby.

When additional power is demanded from the work vehicle 10, such as by its operator, above the maximum power rating of the transmission 14, the controller(s) 72 signal the generator 60 to generate electrical power. Additional power to propel the work vehicle 10 is delivered from the engine 12 through the output element 34, the propulsion shaft 36, the top shaft 42 (without passing through the multi-speed gearing arrangement 40), and the gearset unit 54 to the rotor 88 of the generator 60. Power is also delivered from the motor 64, through the gearbox 74, and the propulsion shafts 46, 48 to the axle assemblies 26, 28. Between the generator 60 and the motor 64, power is conveyed electrically, and specifically, is delivered from the generator 60 to the motor 64 through the conductors 80, the power electronics 68 and the conductors 82 so that the motor 64 delivers power and torque to the axle assemblies 26, 28. The power delivered through the multi-speed gearing arrangement 40 and that delivered through the bypass 49 are added together and supplied to the axle assemblies 26, 28 at power levels that use the entire power capability of the engine 12 without surpassing the power capacity rating of the transmission 14.

Figure 4:
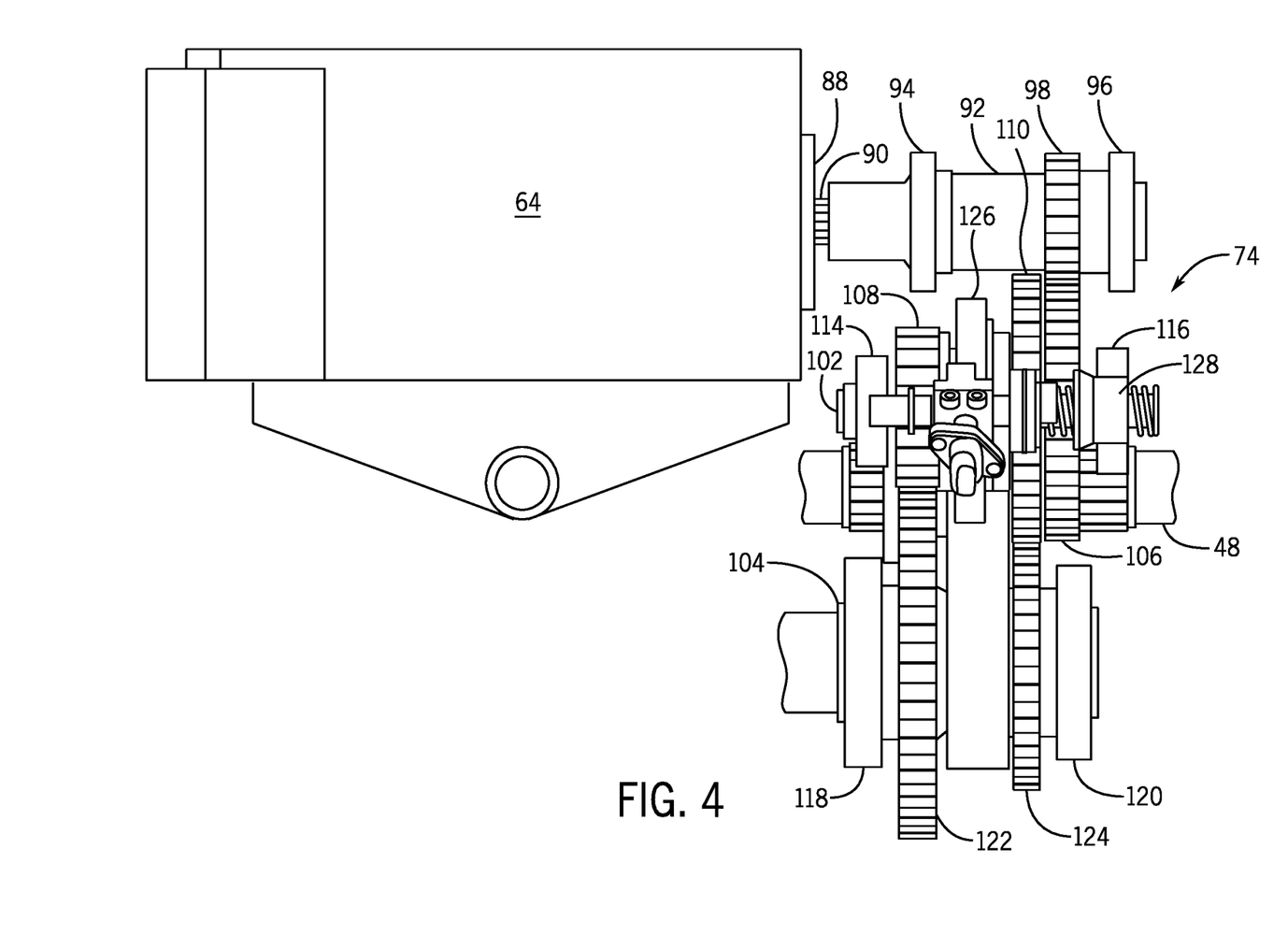
FIG. 4 is an illustration of a motor and a gearbox, with the housing removed, used with the engine power delivery system of FIG. 2, according to this disclosure.
Figure 5:
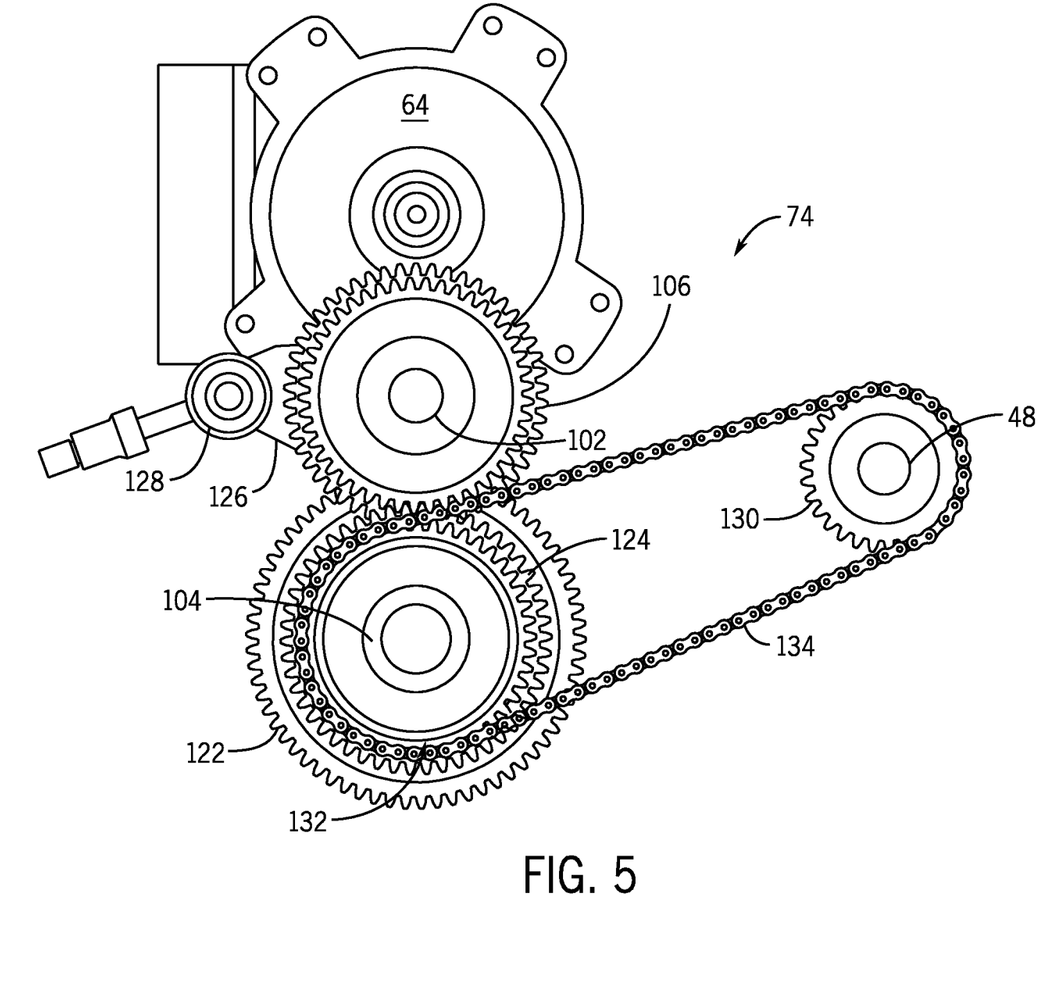
FIG. 5 is a simplified end-view of the motor and gearbox of FIG. 4, according to this disclosure.

Referring additionally to FIGS. 4 and 5, select internal components of the gearbox 74 are shown with the housing removed for visibility. The motor 64 includes a rotor 88 with a shaft 90 that coupled with an input shaft 92 of the gearbox 74. The input shaft 92 is supported by bearings 94, 96, and a gear 98 is fixed on the input shaft 92 to rotate when the rotor 88 rotates. The gearbox 74 includes spaced apart gear shafts 102, 104 both of which are disposed parallel with the input shaft 92. A gear 106 is fixed on the shaft 102 and is in meshing engagement with the gear 98 so that the shaft 102 is driven to rotate when the input shaft 92 rotates. Gears 108, 110 are also disposed in spaced apart relation on the gear shaft 102 and have different sizes (different diameters and/or a different number of teeth). The gears 108, 110 are engaged with the gear shaft 102 so that they rotate therewith and are able to slide along the gear shaft 102, such as through keying or by splines. The gear shaft 102 is supported on bearings 114, 116, and the gear shaft 104 is supported by other bearings 118, 120. The gear shaft 104 carries gears 122, 124 which are fixed to rotate with the gear shaft 104. The gears 122, 124 have different diameters/different numbers of teeth.

To provide two speeds through the gearbox 74, the gears 110 and 124 are meshed together or the gears 108, 122 are meshed together. A shift mechanism 126 and shift actuator 128 operate to slide the gears 108, 110 on the gear shaft 102 to determine which gears are meshed, providing the two speeds through the gearbox 74. This enables use of the motor 64 to provide supplemental power to the axle assemblies 26, 28 over the full speed range of the work vehicle 10.

The propulsion shaft 48 extends through the gearbox 74 and carries a sprocket 130 that is fixed in position to rotate with the propulsion shaft 48. A second sprocket 132 is fixed on the gear shaft 104. A chain 134 is engaged with the sprockets 130, 132 so that the shaft 104, when rotated, drives the propulsion shaft 48. As such, rotation of the rotor 88 drives the axle assemblies 26, 28 adding power to that delivered through the multi-speed gearing arrangement 40.

Figure 3B:
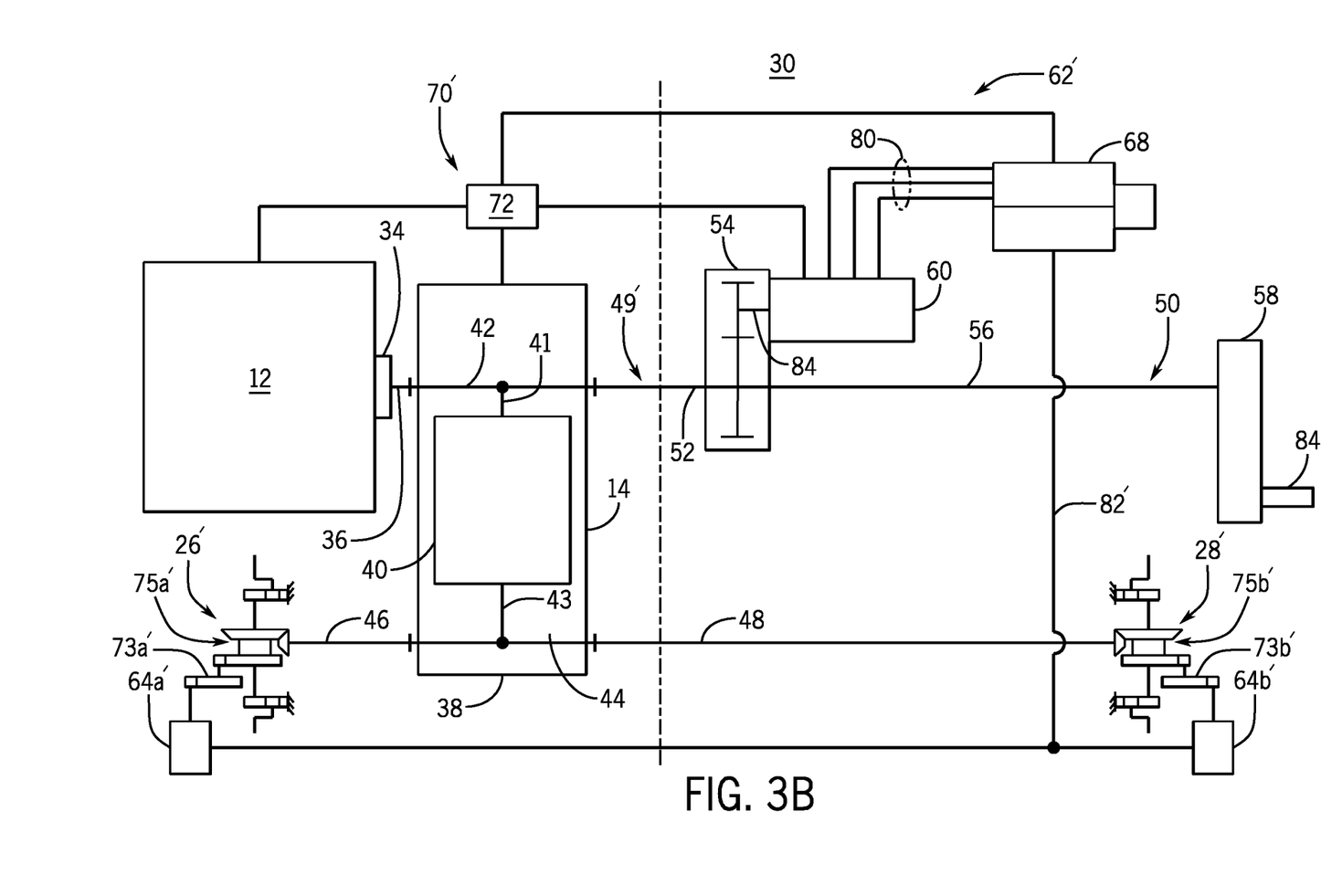
FIG. 3B is a schematic illustration of another example engine power delivery system, according to this disclosure.
Figure 3C:
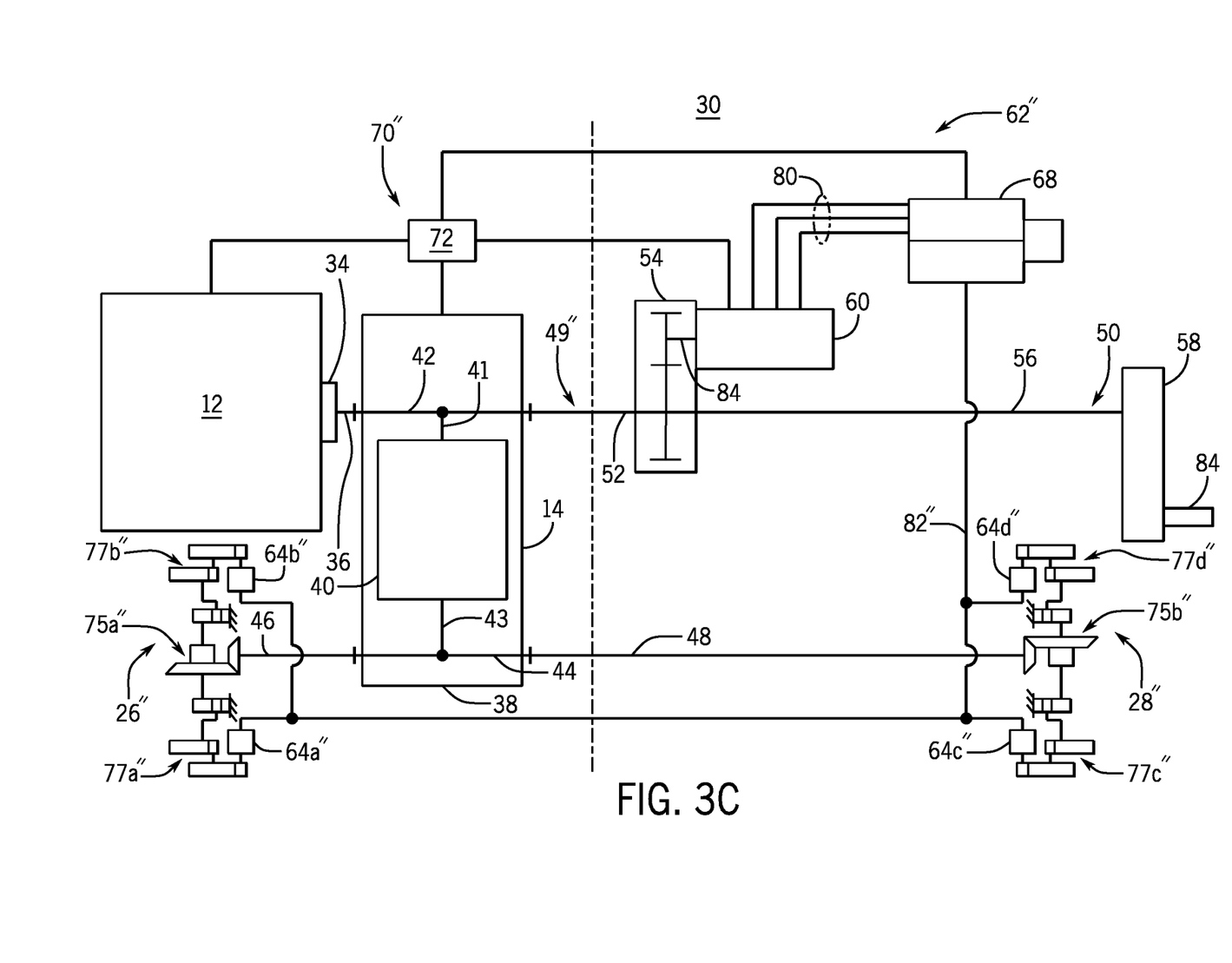
FIG. 3C is a schematic illustration of yet another example engine power delivery system, according to this disclosure.

The engine power delivery system disclosed herein may be implemented in a variety of ways. For example, FIGS. 3B and 3C are schematic diagrams of two alternative arrangements in which electric power input is delivered to the wheels further down stream in the driveline than in the example arrangement shown in FIG. 3A. The electric power is distributed locally to each axle, or to each final drive for each wheel, via separate, multiple electric machines, rather than centralized from a single electric machine. In the following discussion of the examples shown in FIGS. 3B and 3C, much of the engine power delivery system, particularly much of the mechanical components thereof, may be the same or similar to that described with respect to the arrangement of FIG. 3A, and thus like reference numbers will be used. The axle assemblies, while generally the same, will be designated by 26', 28' and 26" and 28" and the bypass, electric drive system and control system, with the motors and electrical lines, will be designated by 49', 49"; 62', 62"; 70', 70"; 64', 64" and 82', 82" in FIGS. 3B and 3C, respectively, to connote the different electric power input arrangements. In each of the distributed electric drive systems shown in FIGS. 3B and 3C, the individual motors may be sized differently or the same as the motor 64. In some cases, since each individual motor will have less load requirements than the single motor 64, the motors in the distributed electric drive systems may be lower capacity (and less costly) motors, each operating with lower power requirements then compared to the motor 64. The distributed electric drive systems also provide the benefit of differential electric power input to the front and rear axle assemblies or even to individual wheels. For example, in the FIG. 3B embodiment, it is possible to provide supplemental electric power to only the front or rear wheels, the same is true in the FIG. 3C embodiment, which has the further capability to provide supplemental electric power to only one or both of the left- or right-side wheels.

Generally, he example shown in FIG. 3B replaces the single motor 64 in the FIG. 3A arrangement with two motors 64$a$' and 64$b$' providing electrical power input to the driveline at the axle assemblies 26', 28'. Otherwise, the electric drive system 62' is generally the same, including the generator 60, power electronics 68, control system 70', and various electric cables or connections. As before, various sensors, actuators and other typical electrical devices may be included but are not shown. And as before, the control system 70' includes at least one controller 72 that is electrically coupled with the engine 12, the transmission 14, the generator 60, and the power electronics 68 to provide control functions. The controller(s) 72 may also be coupled with other devices necessary to provide the desired system control functions including various actuators and sensors such as speed sensors (not shown). The difference here is that the electrical drive system 62' includes the electric motors 64$a$', 64$b$', and thus the control system 70' is configured to control each of these separate electric motors 64$a$', 64$b$', rather than the single motor 64 of the FIG. 3A arrangement.

The electric power delivered from the generator 60, through the power electronics 68, is converted back to mechanical power at the motors 64$a$', 64$b$'. The motors 64$a$', 64$b$' are coupled with the axle assemblies 26', 28' through respective gearboxes 73$a$', 73$b$'. In this example, each of the gearboxes 73$a$', 73$b$' includes two directly meshing gears receiving rotational input from the associated motors 64$a$', 64$b$' that, in turn, couple to another gear that interfaces with, and provides rotational input to, differential assemblies 75$a$', 75$b$' (not explicitly shown in the axles 26, 28 of FIG. 3A) of the associated axle assemblies 26', 28'. The differential assemblies 75$a$', 75$b$' couple to the associated propulsion shafts 46, 48 via bevel gear sets or other suitable mechanical couplings so that the axle assemblies 26', 28' may be driven mechanically by the engine 12 and the multi-speed gearing arrangement 40. In the FIG. 3B arrangement, power of the bypass 49' passes through the transmission housing 38 once without passing through the multi-speed gearing arrangement 40 via the top shaft 42 on route to the generator 60. Mechanical power through the transmission housing 38 is routed to the axle assemblies 26', 28' from the top shaft 42, through the multi-speed gearing arrangement 40, to the bottom shaft 44.

Under normal power requirements of the work vehicle 10 up to the maximum power rating of the transmission 14, power is supplied to the axle assemblies 26', 28' from the engine 12 through the transmission 14, including the multi-speed gearing arrangement 40, and the propulsion shafts 46, 48. Power from the engine 12 is also available at the PTO shaft 84 for use by implements and accessories in the manner described above with respect to FIG. 3A. The control system 70' is programmed to limit power output of the engine 12 to the maximum power rating of the transmission 14, when operating in a pure mechanical mode through the multi-speed gearing arrangement 40. The generator 60 is deactivated during pure mechanical operation and the electric drive system 62' is in standby.

When additional power is demanded from the work vehicle 10, such as by its operator, above the maximum power rating of the transmission 14, power is also delivered from the motors 64a', 64b' to the axle assemblies 26', 28'. Between the generator 60 and the motors 64a', 64b', power is conveyed electrically, and specifically, is delivered from the generator 60 to the motors 64a', 64b' through the conductors 80, the power electronics 68 and the conductors 82' so that the motors 64a', 64b' deliver power and torque to the axle assemblies 26', 28'. The power delivered through the multi-speed gearing arrangement 40 and that delivered through the bypass 49' are added together and supplied to the axle assemblies 26', 28' at power levels that use the entire power capability of the engine 12 without surpassing the power capacity rating of the transmission 14.

The example shown in FIG. 3C replaces the single motor 64 in the FIG. 3A arrangement with four motors 64a"-64d" providing electrical power input to the driveline at the axle assemblies 26", 28" which in this example enters the axle assemblies 26", 28" downstream from the differential assemblies 75a", 75b" at final drives 77a"-77d". Otherwise, the electric drive system 62" is generally the same, including the generator 60, power electronics 68, control system 70", and various electric cables or connections, sensors, actuators and other typical electrical devices. And as before, the control system 70" includes at least one controller 72 that is electrically coupled with the engine 12, the transmission 14, the generator 60, and the power electronics 68 to provide control functions and control of each of these separate electric motors 64a"-64d".

The electric power delivered from the generator 60, through the power electronics 68, is converted back to mechanical power at the motors 64a"-64d", which are coupled with the axle assemblies 26", 28" through the final drives 77a"-77d". The differential assemblies 75a", 75b" couple to the associated propulsion shafts 46, 48 via bevel gear sets or other suitable mechanical couplings so that the axle assemblies 26", 28" may be driven mechanically by the engine 12 and the multi-speed gearing arrangement 40. In the FIG. 3C arrangement, power of the bypass 49" passes through the transmission housing 38 once without passing through the multi-speed gearing arrangement 40 via the top shaft 42 on route to the generator 60. Mechanical power through the transmission housing 38 is routed to the axle assemblies 26", 28" from the top shaft 42, through the multi-speed gearing arrangement 40, to the bottom shaft 44.

Under normal power requirements of the work vehicle 10 up to the maximum power rating of the transmission 14, power is supplied to the axle assemblies 26", 28" from the engine 12 through the transmission 14, including the multi-speed gearing arrangement 40, and the propulsion shafts 46, 48. Power from the engine 12 is also available at the PTO shaft 84 for use by implements and accessories in the manner described above with respect to FIG. 3A. The control system 70" is programmed to limit power output of the engine 12 to the maximum power rating of the transmission 14, when operating in a pure mechanical mode through the multi-speed gearing arrangement 40. The generator 60 is deactivated during pure mechanical operation and the electric drive system 62" is in standby.

When additional power is demanded from the work vehicle 10, such as by its operator, above the maximum power rating of the transmission 14, power is also delivered from the motors 64a"-64d" to the axle assemblies 26", 28". Between the generator 60 and the motors 64a"-64d", power is conveyed electrically, and specifically, is delivered from the generator 60 to the motors 64a"-64d" through the conductors 80, the power electronics 68 and the conductors 82" so that the motors 64a"-64d" deliver power and torque to the axle assemblies 26", 28". The power delivered through the multi-speed gearing arrangement 40 and that delivered through the bypass 49" are added together and supplied to the final drives 77a"-77d" at power levels that use the entire power capability of the engine 12 without surpassing the power capacity rating of the transmission 14.

Through the examples described above, an engine power delivery system 30 delivers engine power to the axle assemblies mechanically through the multi-speed gearing arrangement 40 of the transmission 14, and delivers engine power to the axle assemblies electrically, bypassing the multi-speed gearing arrangement 40 of the transmission 14, to supplement engine power at the axle assemblies, while maintaining a transmission 14 that has a lower capacity/maximum power rating than the total power generated by the engine/maximum engine power level, and delivered to the axle assemblies.

In the various implementations described above (and others), when power is demanded from the work vehicle 10 above the maximum power rating of the transmission 14, electric power (from the generator 60 and various motors) may commence only upon reaching the maximum power rating of the transmission 14. However, electric power may instead commence prior to reaching the maximum power rating of the transmission 14. For example, electric power may be initiated when the engine 12 is operating below the maximum power rating of the transmission 14, and the controller(s) 72 may ramp up the generator 60 to match the current power from the engine 12 to ease the transition between mechanical-only and combined mechanical and electrical power. This may smooth the transition in power flow sufficiently to significantly dampen or avoid entirely shock loads to various driveline components as well as to limit the perception of the power transition to give the work vehicle an enhanced ride quality.

Also, the following examples are provided, which are numbered for easier reference.

1. An engine power delivery system including an engine having an output element; a transmission having a maximum power rating and having a first shaft coupled with the engine output element, wherein the engine is configured to generate a maximum power level that is greater than the maximum power rating of the transmission; a gearing arrangement in the transmission coupled with the first shaft and configured to produce multiple speed ratios; a second shaft coupled with the gearing arrangement; a vehicle axle coupled with the second shaft and configured to be driven thereby; a generator configured to be intermittently driven by the engine to generate electric power; and a motor configured to receive the electric power from the generator and to drive the vehicle axle; wherein the transmission and the motor are configured to combine to drive the vehicle axle up to the maximum power level without the transmission exceeding the maximum power rating.

2. The system of example 1, further including a third shaft configured to be driven by the first shaft bypassing the gearing arrangement; wherein the generator is configured to couple with, and be driven by, the third shaft.

3. The system of example 2, further including: a power take-off driveline configured to couple with the third shaft; and a gearset coupling the generator with the power take-off driveline.

4. The system of example 3, further including a power take-off unit coupled with the power take-off driveline.

5. The system of example 3, wherein the gearset is configured to selectively disengage the generator from the power take-off driveline.

6. The system of example 2, wherein the third shaft is configured to be directly driven by the input shaft and at a common speed therewith.

7. The system of example 6, wherein the first shaft and the third shaft are contiguous with one another.

8. The system of example 2, wherein the engine is configured to supply power to the vehicle axle through the transmission and the second shaft, and simultaneously to the vehicle axle through the third shaft and the motor.

9. The system of example 1, further including a second axle coupled with the transmission and driven together with the vehicle axle; wherein the motor is configured to drive both axles together.

10. The system of example 1, further including a gearbox coupled between the motor and the axle; wherein the gearbox includes: an output gear configured to drive the axle; an input gear driven by the motor; a first shaft carrying first and second gears; a second shaft carrying third, fourth gears and fifth gears; and a chain linking the fifth gear and the output gear; wherein the gearset is configured to alternatively mesh the first gear with the third gears or the second gear with the fourth gear.

11. An engine power delivery system including: an engine driving a first shaft; a transmission coupled with the first shaft; a gearing arrangement in the transmission configured to be driven by the first shaft, and configured to produce multiple speed ratios; a second shaft coupled with the gearing arrangement and configured to be driven at a variety of output ratios relative to the first shaft; a vehicle axle coupled with the second shaft and configured to be driven thereby; a third shaft configured to be driven by the first shaft at a single output ratio relative to the first shaft; a generator configured to be intermittently driven to generate electric power by the third shaft; and a motor electrically coupled with the generator and configured to receive electric power from the generator to drive the vehicle axle.

12. The system of example 11, further including: a power take-off driveline configured to couple with the third shaft; and a gearset coupling the generator with the power take-off driveline.

13. The system of example 12, further including a power take-off unit coupled with the power take-off driveline, the power take-off unit configured to deliver engine power to accessories.

14. The system of example 11, further including: an axle housing, within which at least a portion of the vehicle axle is housed; a gear arrangement coupled between the motor and the vehicle axle; and a gear housing within which the gear arrangement is housed; wherein the gear housing is fixed to the axle housing.

15. The system of example 11, further including: a gearbox including a gear arrangement and coupled between the motor and the vehicle axle; and a propulsion shaft coupled between the gearbox and the vehicle axle and configured to drive the vehicle axle; wherein the gearbox includes: an output gear carried by the propulsion shaft; an input gear fixed to the motor and driven thereby; a first shaft carrying first and second gears; a second shaft, spaced apart from the first shaft and carrying third, fourth gears and fifth gears; a chain linking the fifth gear and the output gear; and an actuator configured to alternatively effect meshing of the first gear with the third gear, or of the second gear with the fourth gear to provide two speed ratios through the gearbox.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An engine power delivery system comprising:
an engine having an output element;
a transmission having a maximum power rating and having a first shaft coupled with the engine output element, wherein the engine is configured to generate a maximum power level that is greater than the maximum power rating of the transmission;
a gearing arrangement in the transmission coupled with the first shaft and configured to produce multiple speed ratios;
a second shaft coupled with the gearing arrangement;
a vehicle axle coupled with the second shaft and configured to be driven thereby;
a generator configured to be intermittently driven by the engine to generate electric power; and
a motor configured to receive the electric power from the generator and to drive the vehicle axle;
wherein the transmission and the motor are configured to combine to drive the vehicle axle up to the maximum power level without the transmission exceeding the maximum power rating.

2. The system of claim 1, further comprising a third shaft configured to be driven by the first shaft bypassing the gearing arrangement; wherein the generator is configured to couple with, and be driven by, the third shaft.

3. The system of claim 2, further comprising:
a power take-off driveline configured to couple with the third shaft; and
a gearset coupling the generator with the power take-off driveline.

4. The system of claim 3, further comprising a power take-off unit coupled with the power take-off driveline.

5. The system of claim 3, wherein the gearset is configured to selectively disengage the generator from the power take-off driveline.

6. The system of claim 2, wherein the third shaft is configured to be directly driven by the first shaft and at a common speed therewith.

7. The system of claim 6, wherein the first shaft and the third shaft are contiguous with one another.

8. The system of claim 2, wherein the engine is configured to supply power to the vehicle axle through the transmission and the second shaft, and simultaneously to the vehicle axle through the third shaft and the motor.

9. The system of claim 1, further comprising a second axle coupled with the transmission and driven together with the vehicle axle; wherein the motor is configured to drive both axles together.

10. The system of claim 1, further comprising a gearbox coupled between the motor and the axle; wherein the gearbox includes:
an output gear configured to drive the axle;
an input gear driven by the motor;
a first shaft carrying first and second gears;
a second shaft carrying third, fourth gears and fifth gears; and
a chain linking the fifth gear and the output gear;
wherein the gearbox is configured to alternatively mesh the first gear with the third gears or the second gear with the fourth gear.

11. An engine power delivery system comprising:
an engine driving a first shaft;
a transmission coupled with the first shaft;
a gearing arrangement in the transmission configured to be driven by the first shaft, and configured to produce multiple speed ratios;
a second shaft coupled with the gearing arrangement and configured to be driven at a variety of output ratios relative to the first shaft;
a vehicle axle coupled with the second shaft and configured to be driven thereby;
a third shaft configured to be driven directly by the first shaft at a common speed therewith;
a generator configured to be intermittently driven to generate electric power by the third shaft; and
a motor electrically coupled with the generator and configured to receive electric power from the generator to drive the vehicle axle.

12. The system of claim 11, further comprising:
a power take-off driveline configured to couple with the third shaft; and
a gearset coupling the generator with the power take-off driveline.

13. The system of claim 12, further comprising a power take-off unit coupled with the power take-off driveline, the power take-off unit configured to deliver engine power to accessories.

14. The system of claim 12, wherein the gearset is configured to selectively disengage the generator from the power take-off driveline.

15. The system of claim 11, further comprising:
an axle housing, within which at least a portion of the vehicle axle is housed;
a gear arrangement coupled between the motor and the vehicle axle; and
a gear housing within which the gear arrangement is housed;
wherein the gear housing is fixed to the axle housing.

16. The system of claim 11, further comprising a second axle coupled with the transmission and driven together with the vehicle axle; wherein the motor is configured to drive both axles together.

17. The system of claim 11, wherein the engine is configured to supply power to the vehicle axle at a first level through the transmission and the second shaft, and simultaneously at a second level to the axle through the third shaft and the motor, so that the axle receives a total power from the engine equal to a sum of the first and second levels.

18. The system of claim 11, further comprising:
a gearbox including a gear arrangement and coupled between the motor and the vehicle axle; and
a propulsion shaft coupled between the gearbox and the vehicle axle and configured to drive the vehicle axle;
wherein the gearbox includes:
an output gear carried by the propulsion shaft;
an input gear fixed to the motor and driven thereby;
a first shaft carrying first and second gears;
a second shaft spaced apart from the first shaft and carrying third, fourth gears and fifth gears;
a chain linking the fifth gear and the output gear; and
an actuator configured to alternatively effect meshing of the first gear with the third gear, or of the second gear with the fourth gear to provide two speed ratios through the gearbox.

19. A power delivery system for a work vehicle comprising:
an internal combustion engine;
a first propulsion shaft configured to be driven by the engine;
a transmission having a transmission housing and an input shaft coupled with the first propulsion shaft, the input shaft extending into the housing;
a gearing arrangement configured to deliver multiple speed ratios and disposed in the transmission housing, the gearing arrangement coupled with the input shaft within the transmission housing;
a front axle configured to be driven by the engine through the transmission;
a second propulsion shaft coupling the front axle with the transmission;
a rear axle configured to be driven by the engine through the transmission;
a third propulsion shaft coupling the rear axle with the transmission;
a gearset;
a fourth propulsion shaft coupling the gearset with the transmission;
a generator coupled with the gearset and configured to be intermittently driven to produce electric power thereby;
a motor electrically coupled with the generator; and
a gearbox through which the second propulsion shaft extends;
wherein the motor is configured to drive the front and rear axles through the gearbox.

* * * * *

UNITED STATES PATENT AND TRADEMARK OFFICE
CERTIFICATE OF CORRECTION

PATENT NO. : 10,807,459 B2
APPLICATION NO. : 16/160265
DATED : October 20, 2020
INVENTOR(S) : Kreis et al.

Page 1 of 1

It is certified that error appears in the above-identified patent and that said Letters Patent is hereby corrected as shown below:

In the Claims

In Column 13, Claim 10, Line 20, delete "fourth gears and fifth" and insert -- fourth and fifth --, therefor.

In Column 13, Claim 10, Line 24, delete "third gears" and insert -- third gear --, therefor.

In Column 14, Claim 18, Line 24, delete "fourth gears and fifth" and insert -- fourth and fifth --, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*